United States Patent [19]

Hinds

[11] Patent Number: 4,501,228
[45] Date of Patent: Feb. 26, 1985

[54] INCUBATOR WITH PYRAMIDAL TOP PORTION

[76] Inventor: Philbirt F. Hinds, 1804-28th Ave. S., Seattle, Wash. 98144

[21] Appl. No.: 448,353

[22] Filed: Dec. 9, 1982

[51] Int. Cl.³ ............................................ A01K 41/00
[52] U.S. Cl. .................................................... 119/37
[58] Field of Search ...................... 119/35, 37, 38, 39, 119/43, 44; 236/2, 3; 237/14

[56] References Cited

U.S. PATENT DOCUMENTS

| 536,617 | 4/1895 | Frey | 119/44 |
|---|---|---|---|
| 871,908 | 11/1907 | Bihn | 119/35 |
| 1,460,349 | 6/1923 | Oakes | 119/37 |
| 1,540,433 | 6/1925 | Staff | 119/43 |
| 2,111,336 | 3/1938 | Schlottmann | 119/35 |
| 3,783,832 | 1/1974 | Marsh | 119/37 |

Primary Examiner—Robert P. Swiatek
Attorney, Agent, or Firm—Cole, Jensen & Puntigam

[57] ABSTRACT

An enclosure (12) defines a lower compartment, while a pyramidal top portion (16) defines an adjacent upper compartment. A base plate (24) separates the upper and lower compartments. The base plate (24) includes a central opening (26), above which is mounted a fan (30). The base plate (24) is configured so that there is a peripheral opening (41) between the edge of the base plate (24) and the side walls (20) of the enclosure (12). Holding mechanisms (38) are provided in the lower compartment for trays of poultry eggs, and are mounted so as to be rotatable through a desired angle above and below the horizontal.

6 Claims, 5 Drawing Figures

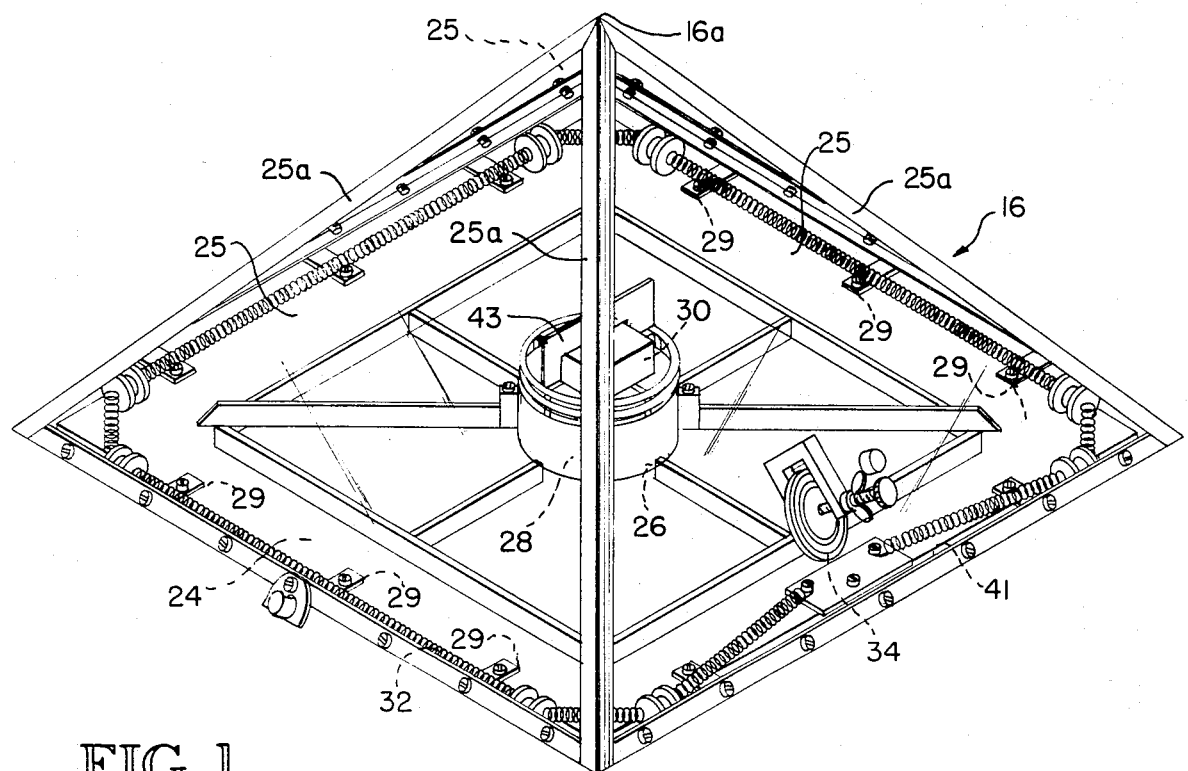
FIG. 1
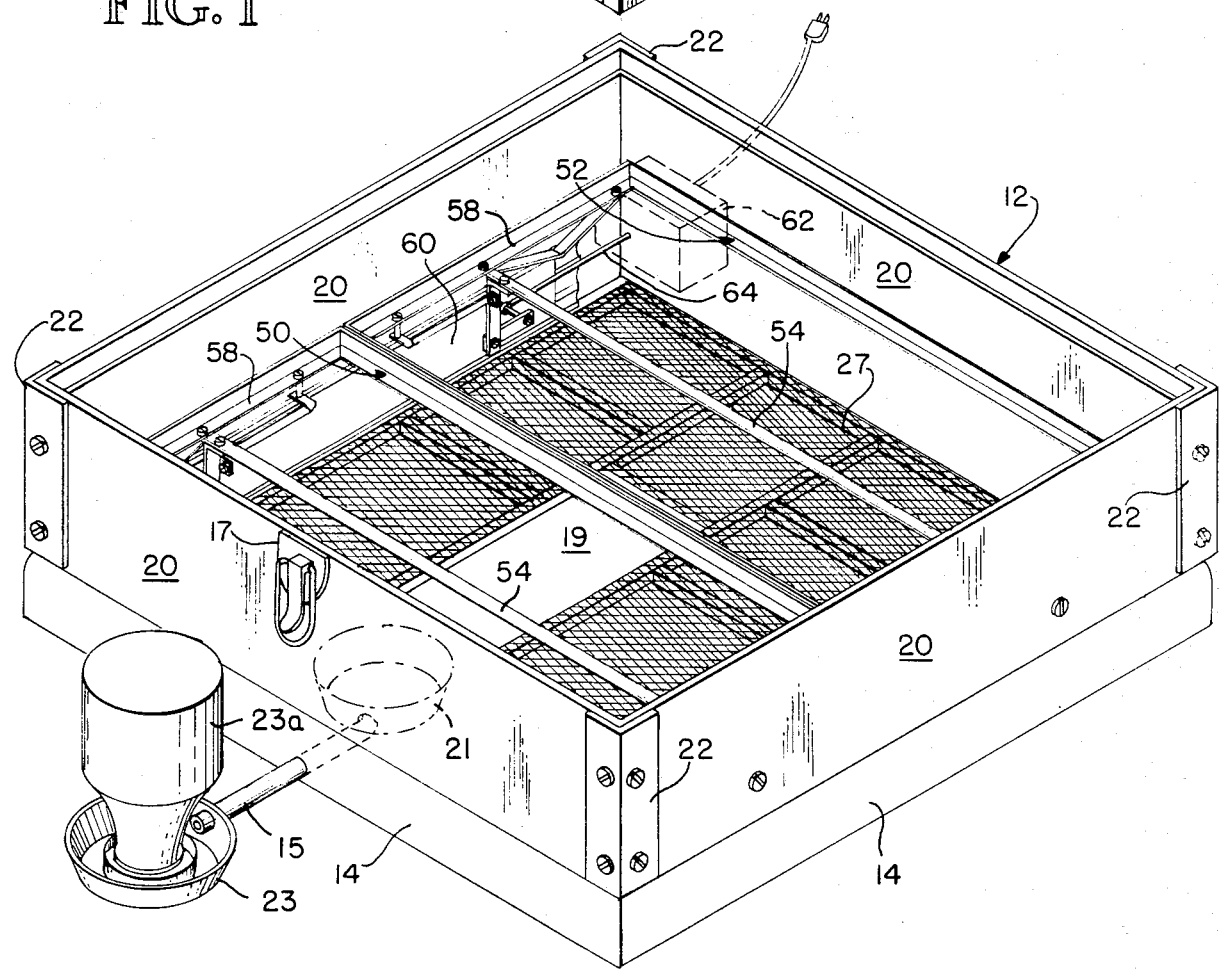

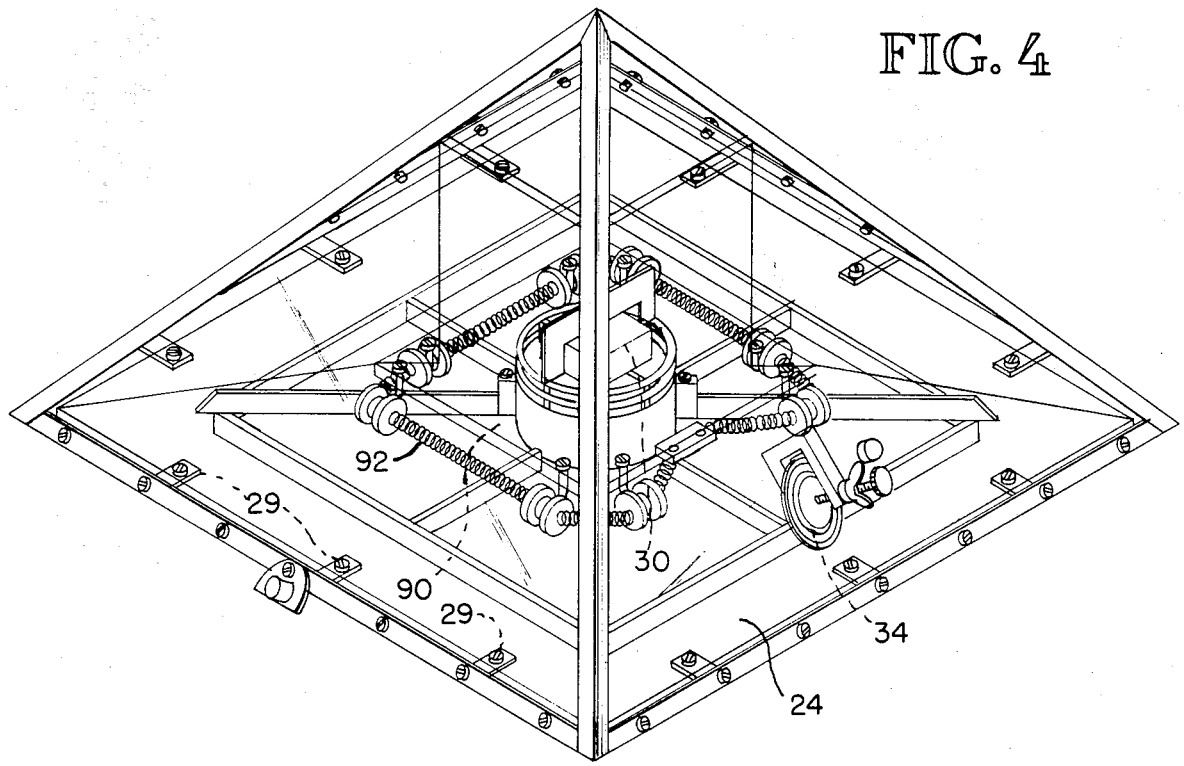
FIG. 4
FIG. 5
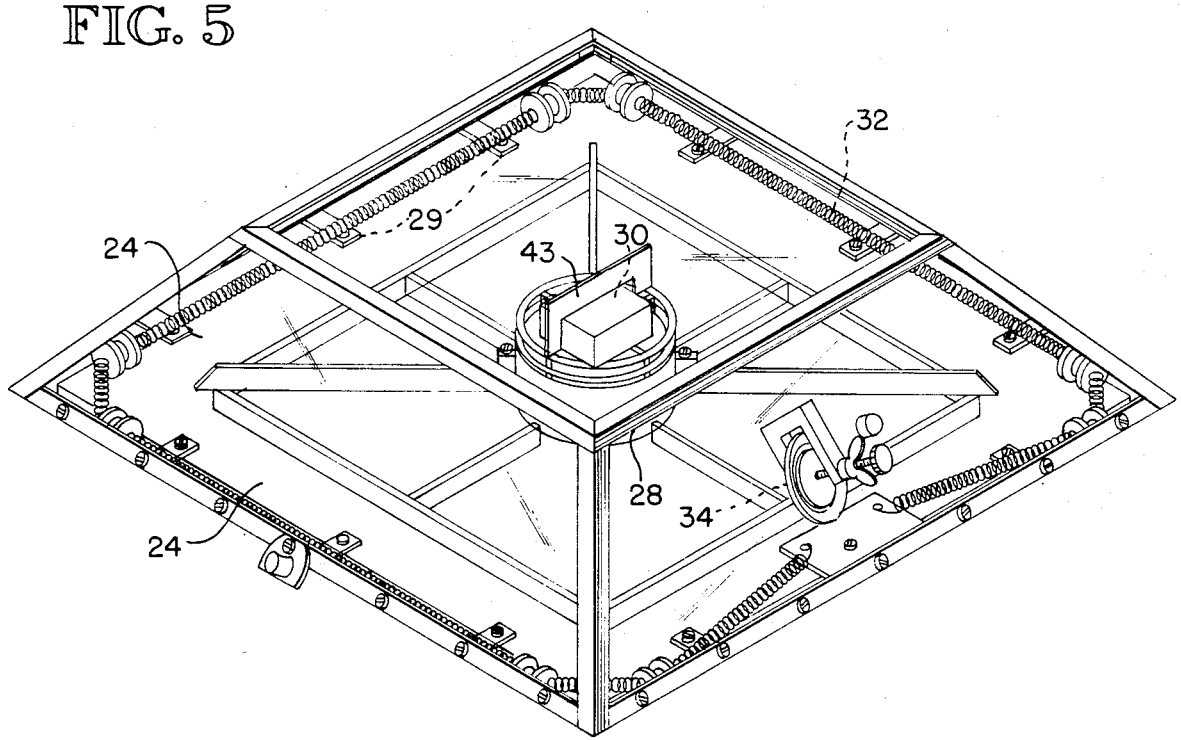

4,501,228

INCUBATOR WITH PYRAMIDAL TOP PORTION

DESCRIPTION

1. Technical Field

This invention relates generally to the art of poultry egg incubators, and more particularly concerns such an incubator having a top portion with a pyramidal or partially pyramidal configuration.

2. Background Art

Incubators for poultry eggs are in general well known. The patents known to applicant which are relevant to the incubator art are U.S. Pat. No. 3,584,605 to Schwartz, U.S. Pat. No. 3,396,703 to Trussell, U.S. Pat. No. 2,764,959 to Church, U.S. Pat. No. 2,646,930 to Dryden, U.S. Pat. No. 2,718,210 to Bonham, U.S. Pat. No. 1,540,433 to Staff, U.S. Pat. No. 1,614,727 to Goble, U.S. Pat. No. 1,893,694 to Bohmker, U.S. Pat. No. 1,918,585 to Biggins, U.S. Pat. No. 2,176,484 to Blakeslee, U.S. Pat. No. 2,184,685 to Brace, and U.S. Pat. No. 2,566,453 to Ketay. Several of the above patents teach an incubator with a lower compartment in which eggs are positioned in trays, and an upper compartment which contains a heating element and fan for heating and circulating the air throughout the lower compartment. Certain of the references show the upper compartment being bounded by top portions of various configuration.

However, such prior art structures frequently have difficulty in maintaining a uniform temperature and air circulation in the lower compartment. Also, many of the prior art egg incubators are constructed so that access to either or both of the lower and upper compartments is quite inconvenient. Further, even with high quality eggs, the percentage of eggs hatched will vary significantly from batch to batch. It is of course desirable that as many eggs as possible be hatched in each batch.

Accordingly, a general object of the present invention is to provide a poultry egg incubator which is capable of overcoming one or more of the disadvantages of the prior art discussed above.

It is another object of the present invention to improve the percentage of eggs hatched, and to maintain a consistently high percentage from batch to batch.

It is a further object of the present invention to provide a substantially uniform temperature in the portion of the incubator where the eggs are hatched.

It is an additional object of the present invention to provide a relatively uniform movement of warm air about the eggs to be hatched.

It is a still further object of the present invention to provide convenient access to the interior of the incubator.

It is yet another object of the present invention to provide an incubator having a configuration, particularly the configuration of the top portion, which improves the operation of the incubator.

DISCLOSURE OF THE INVENTION

Accordingly, the present invention includes a lower compartment which contains means for supporting eggs and an upper compartment which adjoins the lower compartment and which has a pyramidal-like configuration. A base plate separates the lower compartment from the upper compartment and includes an opening which is substantially central of the base plate. The base plate is configured so that there is an opening between the periphery of the base plate and the wall of the lower compartment. Both the central and the peripheral openings permit air communication between the upper and lower compartments. Means are also provided for circulating air between the upper and lower compartments, both through the central and peripheral openings, and for maintaining the circulating air at a desired temperature, so that warm air circulates about the eggs in the lower compartment.

BRIEF DESCRIPTION OF THE DRAWINGS

FIG. 1 is a partially exploded perspective view of one embodiment of the present invention.

FIG. 4 is a perspective view of the top portion of a second embodiment of the present invention.

FIG. 5 is a perspective view of the top portion of a third embodiment of the present invention.

BEST MODE FOR CARRYING OUT THE INVENTION

Figure 2:
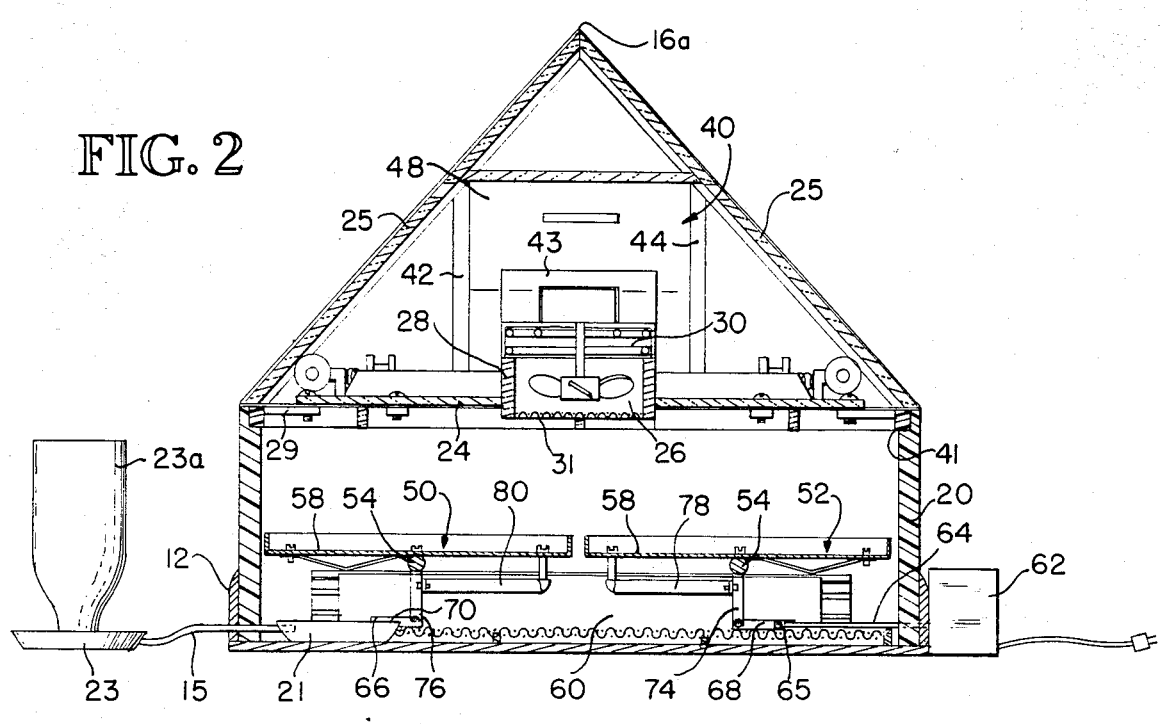
FIG. 2 is a vertical section view of the incubator of FIG. 1.
Figure 3:
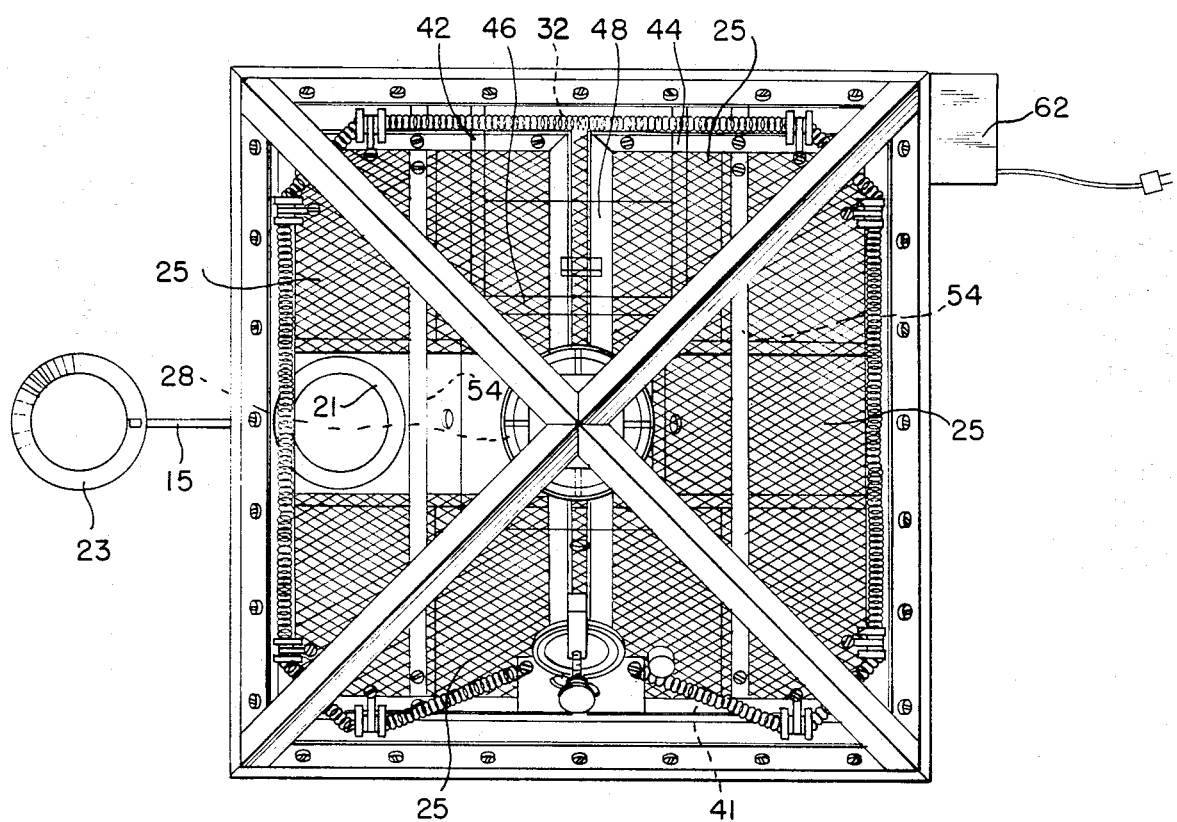
FIG. 3 is a top plan view of the incubator of FIG. 1.

Referring now to FIG. 1, the present invention includes a box-like enclosure 12 defining a lower compartment and a pyramidal top portion 16 which is positioned on top of the enclosure 12 and defines an upper compartment. The top portion 16 is secured, by snaps 17 or the like, to the top edge of the enclosure 12, and can thus be moved away from the top of enclosure 12, providing convenient access to the elements in the lower compartment. Alternatively, the top portion 16 can be attached by hinges so that the top 16 can be rotated relative to the enclosure 12.

The enclosure 12 in the embodiment shown is square in outline, approximately 25 inches on a side and 9½ inches high. The enclosure includes a base 19 and four side walls 20, which may be constructed from various materials, such as wood, plastic or metal. The four side walls 20 are joined together at their corners by angle brackets 22. The side walls may be made high enough so that the eggs can be hatched and the chicks incubated in the same apparatus. A base strip 14 of wood is attached to each side wall along the lower edge thereof, and the base 19 is attached to the base strip. Arranged on the base 19 of enclosure 12 is a conventional screen 27 and support therefore. A circular water tray 21 is positioned in the center of the enclosure 12 on the base 19, and an identical tray 23 is positioned outside of the incubator. The two water trays are connected by a small base 15. Positioned on the outside tray 23 is a water container 23a, which maintains water in tray 23. The hose 15 communicates water to the tray 21.

The pyramidal top portion 16 is configured in one embodiment in the shape of a pyramid, with four triangular sides 25 of equal dimensions, joined together by brackets 25a and converging together to a top point 16a. The lower edge or base dimension of top portion 16 is substantially identical to the top edge dimension of enclosure 12, so that top portion mates securely with enclosure 12. Top portion 16 includes a base plate 24 which forms both the top of the lower compartment, and the base of the upper compartment. Plate 24 in the embodiment shown is a sheet of clear rigid plastic, square in outline, with dimensions slightly less than lower edge dimension of top portion 16 and hence slightly less than the top edge dimension of enclosure 12. Plate 24 is secured to the lower edge of the sides 25 of top portion 16 by metal strips 29, so that there is a gap or opening 41 between the periphery of plate 24 and the lower edge of top portion 16. Hence, when top portion 16 is closed against the top edge of enclosure 12, there is an opening between the peripheral edge of plate 24 and the interior surfaces of side walls 20, permitting air communication between the respective interiors of the lower and upper compartments.

In the center of base plate 24 is a circular opening 26, approximately 5 inches in diameter. Extending upwardly from the edge of opening 26 is a cylindrical wall 28 of clear plastic, approximately 2 inches high. Wall 28 in the embodiment shown extends below plate 24 approximately ½ inch. Stiffening ribs are used on both the upper and lower surfaces of plate 24 and are connected to cylindrical wall 24, so as to stabilize the wall relative to plate 24. Mounted within the space defined by cylindrical wall 28 near the upper end thereof or on the upper edge thereof is a fan 30. A mesh filter screen 31 may be mounted in the lower portion of cylindrical wall 28.

In operation, the fan moves air up from the lower compartment through opening 26, and then out towards the periphery of the upper compartment and then down into the lower compartment through peripheral opening 41. The stiffening ribs serve to stabilize the base plate 24 and the wall 28 when the fan 30 is operating.

The moving air is heated by an electrical element 32 such as a coil or a cal rod, which is mounted around the edge of base plate 24 on the top surface thereof. The air circulating down through opening 41 by the fan 30 is thus heated by the element 32. This results in a uniform flow of warm air throughout the lower compartment, over the eggs. The temperature of the air in the lower compartment is substantially uniform over the crosssectional area of the compartment. To aid in the uniform circulation of air down into the lower compartment, the thin strip baffle 43, approximately ¼ inch wide, may be mounted horizontally a small distance above the fan 30, so that the air drawn up through opening 26 is split to either side of the baffle. The mesh screen 31 in opening 26 helps keep the interior of the incubator clean.

A thermostat 34 is mounted in one of the sides 25 of pyramidal top portion 16. The thermostat 34 controls the operation of electrical element 32 and hence the temperature in the incubator.

In another side of top portion 16 is a window 40 (FIG. 2) which provides access for cleaning or the like to the upper compartment. The window 40 is approximately five inches square, and is bounded by two side tracks 42 and 44 and an upper stop 46. A plate 48 moves in the two tracks 42, 44 along the surface of side 25, opening or closing the window. Alternatively, plate 48 could be held by a spring against the window opening. The operator can then move the plate against the action of the spring to reveal the window opening.

Positioned in the lower compartment are two tray holding mechanisms 50, 52 which each occupy approximately one-half of the cross-sectional area of the lower compartment. Several egg trays may be positioned on each holding mechanism, which comprises a central bar 54 which extends laterally across the lower compartment and is mounted for rotation in the opposite sides of the enclosure 12. Mounted on the bar 54 is a frame 58, comprising a bracket in the form of an open rectangle approximately 24 inches long by 12 inches wide. The individual egg trays containing the eggs to be incubated are placed in frame 58.

The central bar 54 of each tray holding mechanism, and hence the tray frames and the egg trays thereon, may be rotated through a small angle by a motor and lever arrangement. A flat plate 60 (FIGS. 1 and 2) is mounted to ride in a track adjacent one of the side walls 20 to which the central bars of the two tray holding mechanisms are mounted. A reversible motor 62 drives the plate back and forth slowly through lever 64. Extending horizontally from the plate 60 near the bottom thereof beneath each frame 58 are mounts 65, 66. Extending horizontally from the mounts 65, 66 are arms 68, 70, respectively, which are rotatably connected to the lower end of vertical levers 74, 76 respectively, the upper ends of which are secured fixedly to the respective central bars of the two tray holding mechanisms. Support arms or braces 78, 80 extend from the central bar of each tray holding mechanism to approximately the center of the adjacent side of the frame 58.

As the motor operates, the plate 60 and the horizontal arms 68, 70 move back and forth horizontally over a distance of a few inches. This causes the lower end of the vertical levers 74, 76 to move horizontally, thus rotating the central bars 54 and the frames 58. This causes a slight rotation of the eggs about the horizontal, a desirable result. In the embodiment shown, the frames may be rotated as much as 30° above and below the horizontal. This partial rotation is done very slowly, approximately once per hour, and has proven to be helpful in increasing the percentage of eggs hatched.

Although the above structure is shown in the drawings as being mounted directly in the lower compartment, it should be understood that it could be mounted in a drawer which is completely removable from enclosure 12.

Another embodiment of the present invention is shown in FIG. 4. This embodiment is similar to the first embodiment except that it includes an upper horizontal plate 90, also of clear plastic, mounted in the upper compartment above the fan 30. Vehicle bracing plates extend from each joint of the sides of top portion 16 to support the upper horizontal plate 90. The upper horizontal plate 90 is square, approximately 10 inches on a side. In this embodiment, the heating element 92 may be mounted around the edge of the upper horizontal plate 90, on the lower surface thereof. Such an arrangement results in a slightly different pattern of air circulation within the incubator.

A further embodiment is shown in FIG. 5. In this embodiment, the upper part of the top portion 16 is cut off so that the top of the incubator is flat, instead of coming to a point. Such an arrangement can be used with either of the above-described embodiments.

In operation of the incubator, warm air, at the desired temperature, is continuously circulated throughout the lower compartment, over and around the eggs. The air in the lower compartment is uniformly warm and the air circulation is also uniform. The eggs are partially rotated at a desired speed and through a desired angle, while the warm air is circulating about them.

Although a preferred embodiment of the invention has been disclosed for illustration, it should be understood that various changes, modifications and substitutions may be incorporated in such embodiment without departing from the spirit of the invention, as defined by the claims which follow.

I claim:

1. An incubator, comprising:
   a shallow lower compartment containing means for supporting eggs therein, including means for rotating the eggs through a selected angle;
   an upper compartment comprising a base plate and a top cover portion extending over and above said base plate, said upper compartment including an opening around the periphery of said base plate adjacent the lower edge of said top cover portion and a central opening in the base plate, so as to permit air communication between said upper and lower compartments through said central opening and said peripheral opening;
   a cylindrical wall means extending upwardly from about said central opening and downwardly slightly below the lower surface of said base plate;
   a horizontal air baffle plate, separate from said top cover portion, being positioned above, but relatively close to, the upper edge of said cylindrical wall means, said horizontal baffle plate being substantially larger than the cross-sectional area of said cylindrical wall means but substantially smaller than the area of said base plate;
   heating means located substantially closer to the upper edge of said cylindrical wall means then to said peripheral opening; and
   fan means located in said cylindrical wall means for circulating the air between said upper and lower compartments through said central opening and said peripheral opening, so that warm air circulates about the eggs in the lower compartment.

2. An apparatus of claim 1, wherein said air heating means is a heating element positioned about the periphery of said horizontal baffle plate.

3. An apparatus of claim 2, including a narrow vertical air baffle positioned at the top of said cylindrical wall means.

4. An apparatus of claim 3, wherein said top cover portion is pyramidal in configuration.

5. An apparatus of claim 4, wherein the upper part of the top cover portion is flat.

6. An apparatus of claim 2, including means for removably connecting the upper compartment to the lower compartment.

* * * * *